United States Patent
Kang et al.

(10) Patent No.: US 9,626,314 B2
(45) Date of Patent: Apr. 18, 2017

(54) METHOD AND APPARATUS FOR ALLOCATING INTERRUPTIONS

(71) Applicant: Samsung Electronics Co., Ltd., Gyeonggi-do (KR)

(72) Inventors: Byoung Ik Kang, Seoul (KR); Joong Baik Kim, Seoul (KR); Seung Wook Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 526 days.

(21) Appl. No.: 14/356,128

(22) PCT Filed: Nov. 5, 2012

(86) PCT No.: PCT/KR2012/009224
§ 371 (c)(1),
(2) Date: May 2, 2014

(87) PCT Pub. No.: WO2013/066124
PCT Pub. Date: May 10, 2013

(65) Prior Publication Data
US 2014/0359184 A1 Dec. 4, 2014

(30) Foreign Application Priority Data

Nov. 3, 2011 (KR) .................. 10-2011-0114165

(51) Int. Cl.
*G06F 9/46* (2006.01)
*G06F 13/26* (2006.01)
(Continued)

(52) U.S. Cl.
CPC ............ *G06F 13/26* (2013.01); *G06F 9/4812* (2013.01); *G06F 9/5083* (2013.01); *G06F 2213/2414* (2013.01)

(58) Field of Classification Search
None
See application file for complete search history.

(56) References Cited

U.S. PATENT DOCUMENTS

| 7,581,052 B1 | 8/2009 | Solomita |
| 2003/0120702 A1 | 6/2003 | Jahnke |
| 2007/0005742 A1 | 1/2007 | Eldar et al. |

FOREIGN PATENT DOCUMENTS

KR 10-0321408 6/2002

OTHER PUBLICATIONS

International Search Report dated Mar. 28, 2013 in connection with International Patent Application No. PCT/KR2012/009224, 3 pages.

(Continued)

*Primary Examiner* — Gregory A Kessler

(57) ABSTRACT

The present disclosure relates to a method and an apparatus for allocating interruptions in a multi-core system. A method for allocating interruptions in a multi-core system according to one embodiment of the present disclosure comprises: an interrupt load extraction step of extracting interrupt loads of each interruption type; a step of extracting task loads of each core; a weighting factor determination step of determining weighting factors using a difference between task loads of the cores; a step of reflecting weighting factors to extract a converted value of the interrupt load; and an interruption allocation step of allocating interruption types to the cores such that the sums of the converted values of the interrupt loads allocated to each core and the allocated task loads are uniform. According to one embodiment of the present disclosure, interruptions can be allocated such that both task processing and interruption processing can be performed in an efficient manner.

12 Claims, 10 Drawing Sheets

(51) Int. Cl.
*G06F 9/48* (2006.01)
*G06F 9/50* (2006.01)

(56) References Cited

OTHER PUBLICATIONS

Written Opinion of International Searching Authority dated Mar. 28, 2013 in connection with International Patent Application No. PCT/KR2012/009224, 3 pages.

METHOD AND APPARATUS FOR ALLOCATING INTERRUPTIONS

TECHNICAL FIELD

The present disclosure relates to an interrupt allocation method and apparatus and, in particular, to a method and apparatus for allocating interrupts effectively in a multi-core system.

BACKGROUND ART

Recently, multi-core processors are used widely for High Performance Computing in embedded systems such as mobile phone and tablet PC. The multi-core system is used for handling higher performance embedded applications. The multi-core system has to process various interrupt requests generated between peripheral devices and cores. In order to enhance the performance of the multi-core system, it is one of the significant issues to distribute the loads fairly among the cores.

However, the interrupt is not controlled by the scheduling of the normal Operating System. Accordingly, the load imbalance among the cores may cause bottleneck effect to the system. In order to improve the processing performance of the multi-core system, there is a need of a method of processing interrupts efficiently.

Many researches have been conducted on the method of allocating interrupts to the cores in the multicore system. A few conventional technologies of handling interrupts are described hereinbelow.

The first distribution method is to distribute the interrupts based on the number of interrupts processed by the core. The interrupt allocation device calculates interrupt load index based on the number of interrupts processed by one core during a predetermined time period. The interrupt allocation device allocates the interrupt occurring at the highest frequency to the core processed the least number of interrupts. The interrupt allocation device adjusts the number of interrupts to be handled by each core in this way.

According to the first distribution method, the interrupts are distributed based on the number of processed interrupts, thereby causing the following problem. The interrupt handling time varies depending on the interrupt service routine. Accordingly, although the numbers of interrupt processing times of the respective cores are maintained equally, the load may not be distributed evenly.

The second distribution method is to allocate the interrupts occurring during a predetermined time period to one core. For example, the interrupt allocation device allocates all of the interrupts occurring during the time period t0 to the core 0 and all of the interrupts occurring during the time period t1 to the core 1. The interrupt allocation device changes the core to be allocated interrupts at a predetermined interval. The interrupt allocation device allocates the interrupts occurring during a predetermined time period to the corresponding core so as to adjust the number of interrupts allocated to each core.

According to the second distribution method, if several interrupts occur simultaneously, the interrupts may be concentrated to a specific core. In this case, the Interrupt Response Time increases so as to cause a problem of degrading the system performance.

The third distribution method is for a device driver to determine the core to process the interrupt. The device driver monitors the usage of the core periodically. If the difference between the usage of the core allocated a specific interrupt previously and the usage of the core having the least usage is greater than a predetermined margin, the device driver allocates the corresponding interrupt to the core having the least usage.

According to the third distribution method, the device driver monitors the usage of each core and allocates the interrupt to the core having the lease usage. In this case, several interrupts are concentrated to the core having the least usage so as to cause the problem of increasing the Interrupt Response Time. Also, the scheduler of the normal operating system performs load balancing in a way of balancing the usages of the cores. At this time, the interrupt allocation process of the device driver and the load balancing process of the schedule may collide and thus degrade the system performance.

The fourth distribution method is to distribute interrupts based on token. If an interrupt occurs outside, the interrupt allocation device generates a token. Afterward, the interrupt allocation device transfers the corresponding interrupt to a Hot Group assigned with priority. In the case that the first core of the hot group is capable of processing the corresponding interrupt, it processes the interrupt. In the case that the first core of the hot group is incapable of processing the corresponding interrupt, the corresponding core transfer the corresponding interrupt to another core and, at this time, the number of tokens decrement by 1. The interrupt processing device performs of finding the core capable of processing the interrupt until the number of token becomes 0. If the number of tokens becomes 0, the core which has received the corresponding interrupt at the time when the number of tokens becomes 0 processes the corresponding interrupt.

According to the fourth distribution method, the time taken to allocate the interrupt and complete processing it is likely to be elongated. If the number of tokens is set to a small value in order to avoid the above problem, the first core of the hot group processes the interrupts mostly. As a result, interrupt processing is concentrated to a specific core.

DISCLOSURE OF INVENTION

Technical Problem

The present disclosure has been proposed to solve the above problems and aims to provide an interrupt allocation apparatus and method capable of processing interrupts quickly without disturbance to other tasks.

Solution to Problem

In accordance with an aspect of the present disclosure, an interrupt allocation method of a multi-core system includes checking interrupt loads of individual interrupt types, checking task loads of individual cores, determining weighting factors using differences between the task loads of the cores, calculating conversion values of interrupt loads by reflecting the weighting factors, and allocating the interrupt types to the cores to make sums of conversion values of the interrupt loads allocated to the individual cores and the task loads equal each other.

In accordance with another aspect of the present disclosure, an interrupt allocation apparatus of a multi-core system includes a reception unit which receives an interrupt, a storage unit stores interrupt loads by interrupt type, and a distribution unit which checks and store task loads of individual cores, determines weighting factors using differences between the task loads of the cores, calculates conversion values of interrupt loads by reflecting the weighting factors, and allocates the interrupt types to the cores to make sums of conversion values of the interrupt loads allocated to the individual cores and the task loads equal each other.

Advantageous effects of Invention

The interrupt allocation method and apparatus of the present disclosure is advantageous in processing the interrupts quickly and allocating the interrupt with the least disturbance to other tasks.

MODE FOR THE INVENTION

Figure 1:
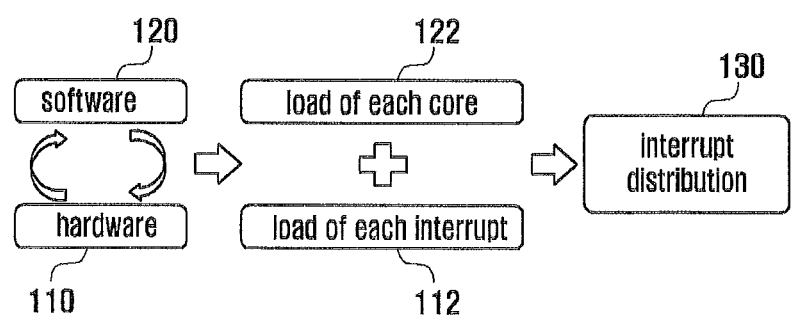
FIG. 1 is a conceptual diagram illustrating the interrupt distribution method according to an embodiment of the present disclosure.

Exemplary embodiments of the present disclosure are described with reference to the accompanying drawings in detail.

Detailed description of well-known functions and structures incorporated herein may be omitted to avoid obscuring the subject matter of the present disclosure. This aims to omit unnecessary description so as to make the subject matter of the present disclosure clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

The interrupt allocation method and apparatus according to embodiments of the present disclosure are described hereinafter with reference to the accompanying drawings.

In the following description, the terminal 'interrupt load' denotes the load required for processing a certain type of interrupt for a unit time.

In the following description, the terminal 'task load' denotes the load required for the task allocated to a certain core.

FIG. 1 is a conceptual diagram illustrating the interrupt distribution method according to an embodiment of the present disclosure.

In the case that interrupt request occurs frequently in a multi-core system, this influence the load of each core. In the normal operating system of the multi-core system, a scheduler adjusts the load of each core. Accordingly, the interrupt distribution and load adjustment at the scheduler should be considered simultaneously. In the present disclosure, the interrupt allocation device distributes interrupts to the cores, as denoted by reference number 130, in consideration of both the interrupt load 112 measured by the hardware 110 and the load 122 of each core which has been measured by the scheduler as a part of the software 120.

Figure 2:
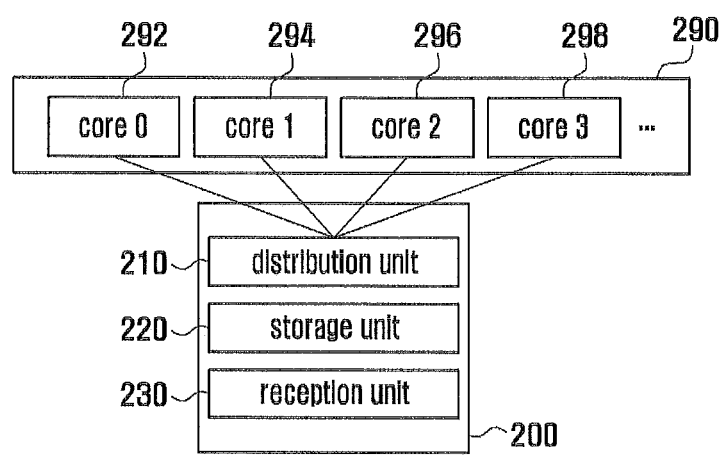
FIG. 2 is a block diagram illustrating the interrupt allocation apparatus 200 according to an embodiment of the present disclosure.

FIG. 2 is a block diagram illustrating the interrupt allocation apparatus 200 according to an embodiment of the present disclosure. The interrupt allocation apparatus 200 includes a distribution unit 210, a storage unit 220, and a reception unit 230. The interrupt allocation apparatus 200 allocates interrupts to the cores 290 including core 0 292, core 1 294, core 2 296, and core 3 298.

The reception unit 230 receives an occurred interrupt and transfers the interrupt to the distribution unit 210.

The storage unit 220 stores information necessary for interrupt allocation. The information necessary for interrupt allocation may include at least one of a number of interrupt occurrence times during a predetermined time interval and time taken to process the interrupt. The interrupt taken to process the interrupt may include Interrupt Handler (IH) execution time and Integupt Service Task (ISR) execution time. The storage unit 220 may store further necessary information according to an embodiment of the present disclosure.

The distribution unit 210 allocates the interrupt transferred by the reception unit 230 to any of the cores 292, 294, 296, and 298. The distribution unit 210 allocates the interrupt in consideration of the load of the occurred interrupt and the load of the task allocated to each core. The detailed operations of distribution unit 210 and other component of the interrupt allocation apparatus 200 are described hereinafter with reference to FIGS. 3 to 10.

Figure 3:
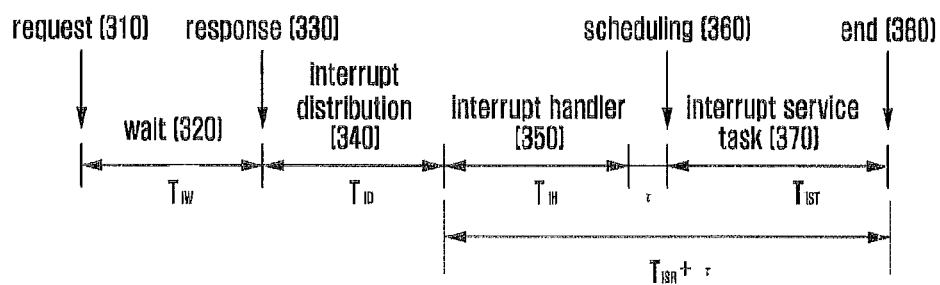
FIG. 3 is a diagram illustrating a procedure of processing the interrupt completely after the occurrence of the interrupt.

FIG. 3 is a diagram illustrating a procedure of processing the interrupt completely after the occurrence of the interrupt.

An interrupt request occurs at operation 310. Afterward, time $T_{IW}$ elapses until the interrupt allocation apparatus 200 detects the interrupt as denoted by reference number 320. The reception unit 230 of the interrupt allocation apparatus 200 detects and receives the interrupt request and responds to this at operation 330. The reception unit 230 transfers the received interrupt request to the distribution unit 210. Afterward, the distribution unit 210 of the interrupt allocation apparatus 200 distributes the interrupt at operation 340. It takes time $T_{ID}$ to distribute the interrupt. Afterward, the Interrupt Handler (IH) is running for time $T_{IH}$ at operation 350. After the delay time τ, the scheduler of the operating system schedules Interrupt Service Task (ISR) at operation 360. The service task is performed during the time $T_{IST}$ at operation 370. Afterward, the interrupt processing ends at operation 380.

Equation (1) defines the Interrupt Processing Time $T_I^i$ of interrupt i.

$$T_I^i = T_{ID}^i + T_{ISR}^i \qquad (1)$$

As described above, $T_{ID}^i$ is the time between the time point when the interrupt allocation apparatus 200 detects the occurrence of the interrupt I and the time point when the interrupt service routine for the interrupt i starts. $T_{ISR}^i$ denotes the time taken to perform the interrupt service routine for the interrupt i. The interrupt service routine is comprised of the interrupt handler and the interrupt service task. The scheduler of the operating system sorts the interrupt service task into normal task and processes the task. Accordingly, there may be the delay time τ before executing the service task after the completion of the interrupt handler. Accordingly, the interrupt processing time $T_I^i$ of the interrupt i is defined as equation (2).

$$T_I^i = T_{ID}^i + T_{IH}^i + T_{IST}^i \quad (2)$$

$T_{IH}^i$ denotes the running time of the interrupt handler for interrupt i. $T_{IST}^i$ denotes the running time of the interrupt service task. The interrupt processing time may vary depending on the system condition such as Cache, Memory Access Pattern, and Traffic occurrence amount. The interrupt allocation apparatus 200 may store the running time of the interrupt handler per interrupt and/or the running time of the interrupt service task. How to measure and store the running time of the interrupt handler and/or the running time of the interrupt service task is described later with reference to FIGS. 4 and 5. Afterward, interrupt allocation may be performed based on the stored running time of the interrupt handler and/or running time of the interrupt service task. The average value acquired through system level analysis may replace the running time of the interrupt handler and/or the running time of the interrupt service task.

The interrupt occurrence frequency (Arrival Rate) $\lambda_I^i$ of interrupt i is defined as a number of interrupts occurred during a predetermined unit time. The arrival rate of the interrupt occurring periodically may be calculated based on the occurrence interval. The arrival rate occurring non-periodically may be calculated based on the number of interrupts occurring during a predetermined time period. How to record the number of interrupt occurrence times are described later with reference to FIGS. 4 and 5.

Figure 4:
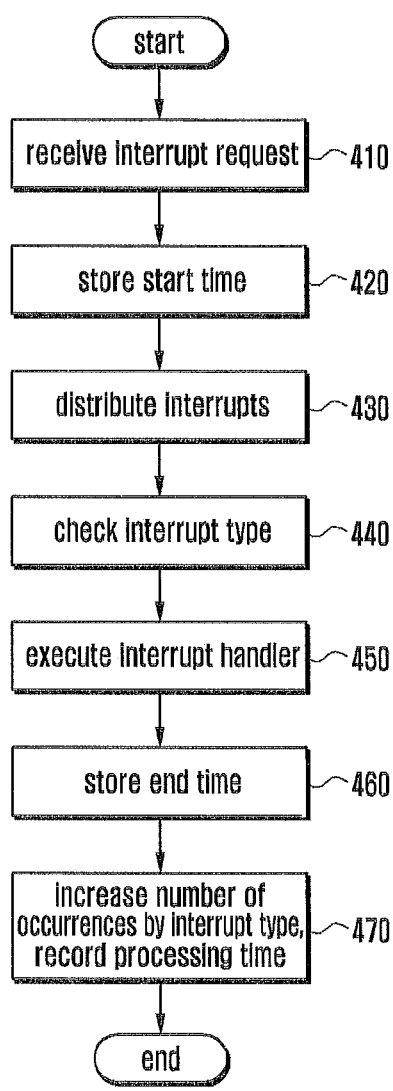
FIG. 4 is a flowchart 400 illustrating a procedure of recording the number of interrupt occurrence times the time taken to execute the interrupt handler and distribute the interrupt according to an embodiment of the present disclosure.

FIG. 4 is a flowchart 400 illustrating a procedure of recording the number of interrupt occurrence times the time taken to execute the interrupt handler and distribute the interrupt according to an embodiment of the present disclosure.

The reception unit 230 receives the interrupt request at operation 410. The reception unit 230 transfers the received interrupt request to the distribution unit 210. The storage unit 220 stores the start time of processing the interrupt request at operation 420. The distribution unit 210 distributes the interrupt according to the method of the present disclosure at operation 430. Detailed distribution method is described throughout the present disclosure. The distribution unit 210 checks the type of the received interrupt at operation 440. The type of interrupt may be the Interrupt ReQuest (IRQ) identifier (ID) as an example. That is, the interrupts having the same IRQ ID may be handled as the same type interrupts.

If the interrupt is allocated, the core executes the interrupt handler for the corresponding interrupt at operation 440. If the interrupt handler has completed execution, the storage unit 220 stores the end time.

At operation 450, the storage unit 220 increases the number of occurrence times of the corresponding interrupt based on interrupt type checked at operation 440. At operation 460, the storage unit 220 stores the processing time acquired by subtracting the start time of operation 420. At operation 470, the processing time corresponds to the sum of the interrupt distribution time and the interrupt handler running time, i.e. $T_{ID}^i + T_{IH}^i$.

The distribution unit 210 may calculate the interrupt arrival rate based on the number of interrupts occurring during a predetermined time interval. After the interrupt arrival rate is calculated, the number of interrupt occurrence times may be reset.

The interrupt arrival rate and the time taken for interrupt distribution and the interrupt handler execution that are calculated as above may be further processed, e.g. to calculate average value, for use in estimating load of the corresponding type of interrupt.

Figure 5:
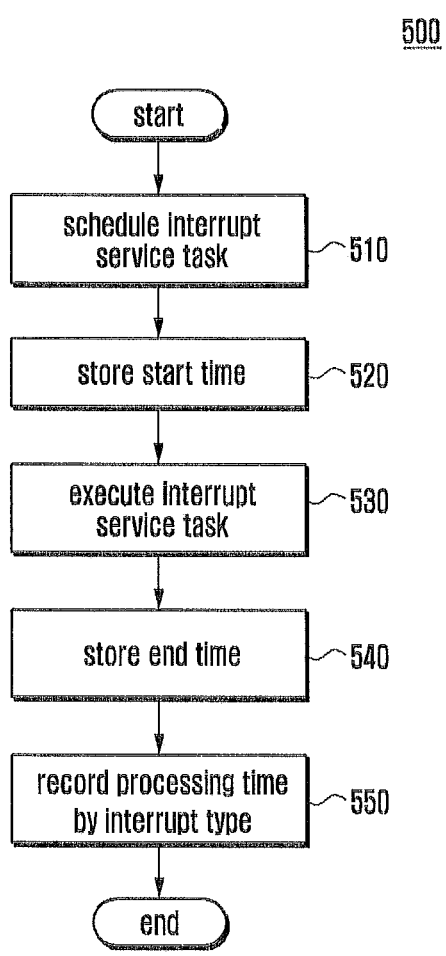
FIG. 5 is a flowchart 500 illustrating a procedure of recording the interrupt service task running time according to an embodiment of the present disclosure.

FIG. 5 is a flowchart 500 illustrating a procedure of recording the interrupt service task running time according to an embodiment of the present disclosure. When the interrupt request for executing the interrupt service task is processed, the procedure of FIG. 5 is performed in subsequence to the procedure of FIG. 4. However, the procedure of FIG. 5 may be omitted for the interrupt request for which interrupt service task execution is not necessary.

An interrupt service task is scheduled at operation 510. The storage unit 230 stores the start time of the interrupt service task at operation 520. The core which is allocated the interrupt service task executes the corresponding interrupt service task at operation 530. If the interrupt service task has completed, the storage unit 230 stores the end time of the interrupt service task at operation 540. At operation 550, the storage unit stores the processing time acquired by subtracting the start time of operation 520 from the end time of operation 540 as the interrupt service task execution time of the corresponding interrupt type, i.e. $T_{IST}^i$.

The procedures of FIGS. 4 and 5 are performed to estimate the time taken to process each interrupt $T_I^i$ and the arrival rate $\lambda_I^i$. If it is possible to estimate the time taken to process each interrupt $T_I^i$ and the arrival rate $\lambda_I^i$ with another method, the method may be used.

Equation (3) defines the load $L_I^i$ caused by interrupt i.

$$L_I^i = \lambda_I^i T_I^i \quad (3)$$

The operating system for multi-core processor is capable of performing load balancing among the cores. The scheduler of the operating system tries to keep the numbers of the tasks waiting in the run queues of the cores equally. Equation (4) defines the task load $L_C^j$ of core j.

$$L_C^j = N_C^j \quad (4)$$

$N_C^j$ denotes a number of tasks waiting in the run queue of the core j.

Figure 6:
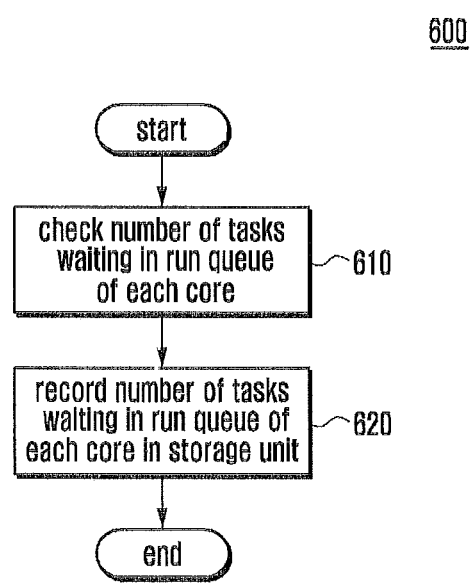
FIG. 6 is a flowchart illustrating a procedure of measuring the task load of a core.

FIG. 6 is a flowchart illustrating a procedure of measuring the task load of a core.

The distribution unit 210 checks the number of tasks $N_C^j$ waiting in the run queue of each core at operation 610. The storage unit 230 stores the checked number of tasks $N_C^j$ at operation 620.

The number of tasks $N_C^j$ per core may be used for interrupt distribution.

Figure 7:
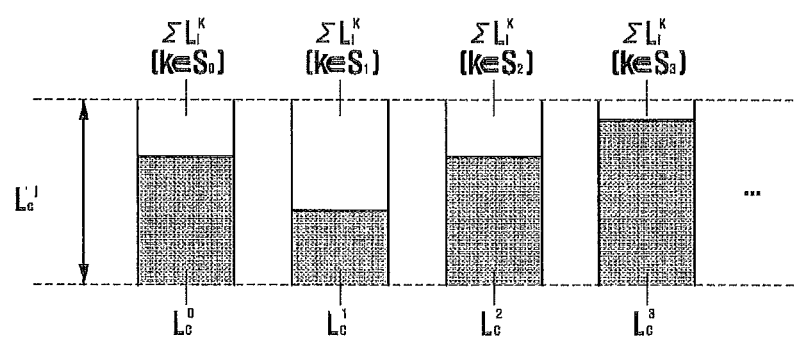
FIG. 7 is a diagram illustrating a principle of distributing interrupts in consideration of both the interrupt load $L_1$ and the core task load $L_C$ of the core.

FIG. 7 is a diagram illustrating a principle of distributing interrupts in consideration of both the interrupt load $L_I$ and the core task load $L_C$ of the core. Equation (5) defines the task load of the core j $L'_C{}^j$ after interrupt distribution.

$$L'^j_C = L^j_C + \sum_{k \in S_j} L^k_I \quad (5)$$

$S_j$ denotes a set of interrupts allocated to core j. The interrupt allocation apparatus 200 allocates interrupts to the cores such that the loads $L'_C{}^j$ of the cores are equal basically in consideration of the interrupts. However, the distribution may be performed alternatively as to be described hereinafter.

The scheduler of the operating system performs task load balancing among the cores. In spite of task load balancing, however, the task loads of the cores may be unequal each other. Also, the sum of the load differences between the core having the least task load and the loads of the other cores may be greater than the sum of the loads of all interrupts. In this case, the interrupts may be concentrated to a specific core and thus causes degradation of interrupt processing capability. Equation (6) defines the weighting factor $W_I$ for use in calculating conversion value of the interrupt load to the task load of the core.

$$W_I = \alpha \times \frac{\sum_{j \in U_c} \left[ \underset{j \in U_c}{\text{Max}}\{L_C^j\} - L_C^j \right]}{\sum_{k \in U_I} L_I^k} \quad (6)$$

$U_C$ denotes the universal set of cores. $U_I$ denotes the universal set of interrupts. If the weighting factor $W_I$ is equal to or less than 1, it is calculated that the weighting factor $W_I$ is 1 to extract the interrupt load $L_I^i$ as the conversion value. If the weighting factor $W_I$ is greater than 1, the value acquired by multiplying the weighting factor $W_I$ to the interrupt load $L_I^i$ is extracted as the conversion value of the interrupt load. Equation (7) defines the entire load $L''_C{}^j$ in consideration of the weighting factor $W_I$.

$$L''_C{}^j = L_C^j + \sum_{k \in S_j} W_I L_I^k \quad (7)$$

The distribution unit 210 may allocate interrupts in a way of equalizing the entire load $L''_C{}^j$ of each core.

Figure 8:
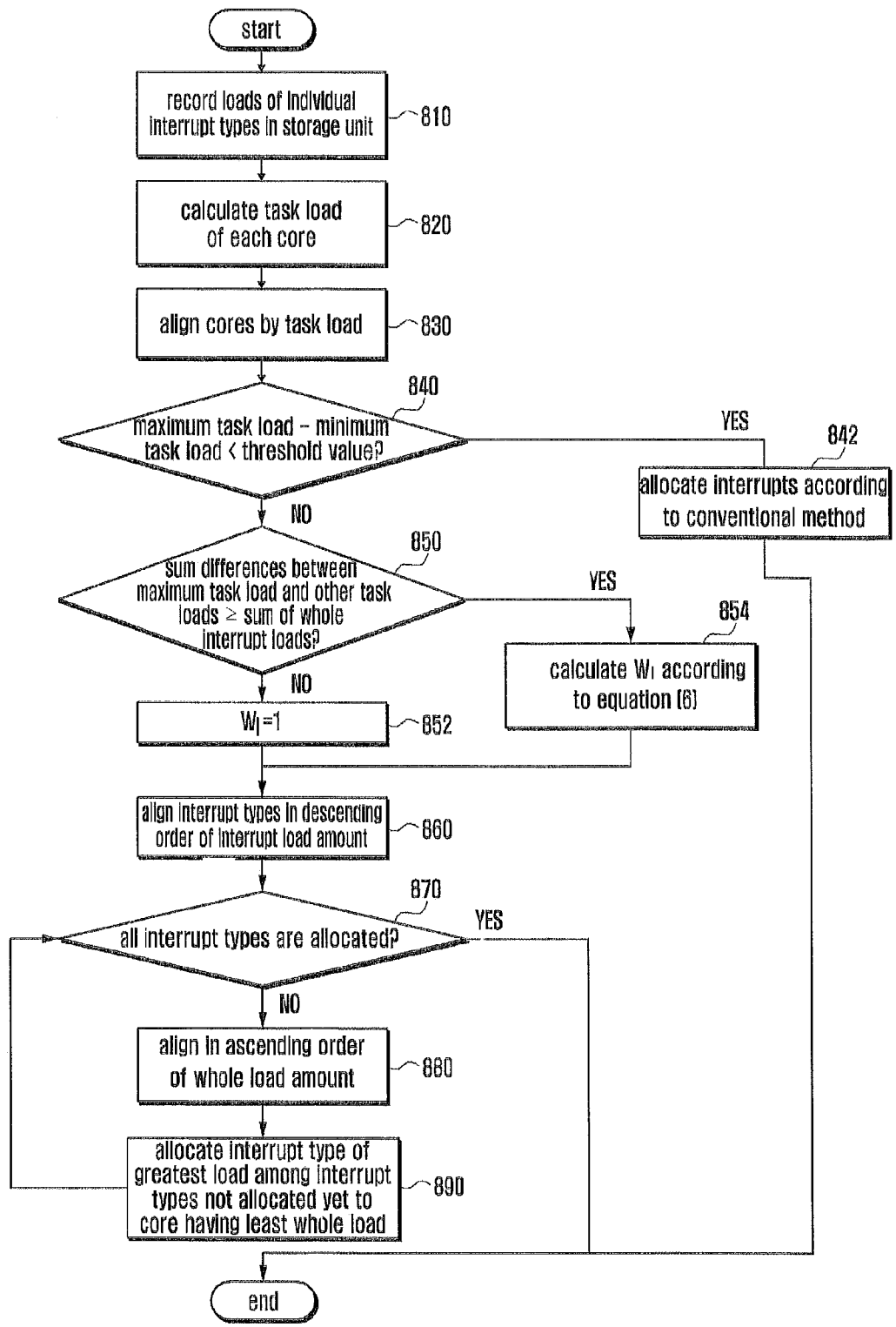
FIG. 8 is a flowchart illustrating the interrupt allocation procedure according to an embodiment of the present disclosure.

FIG. 8 is a flowchart illustrating the interrupt allocation procedure according to an embodiment of the present disclosure. It is assumes that the procedure of FIG. 8 is performed after extracting the specific type of load (e.g. IRQ) through the procedures of FIGS. 4 and 5. In the following procedure, the interrupt is allocated to the corresponding core per type. For example, the interrupt of IRQ 3 may be allocated to core 2, and the interrupt of IRQ 1 to core 0.

The distribution unit 210 records the respective types of loads in the storage unit 230 at operation 810. As described with reference to FIGS. 4 and 5, the distribution unit 210 may extracts the value of the load of a specific type of interrupt. The distribution unit 210 stores such information in the storage unit 230. For example, the interrupt corresponding to IRQ 1 may have the load of 3 while the interrupt corresponding to IRQ 3 may have the load of 9.

The distribution unit 210 calculates the task load of each core at operation 820. The task load of each core has been described with reference to equation (3). The distribution unit 210 sorts the cores by the task load.

The distribution unit 210 determines whether the value acquired by subtracting the minimum task load from the maximum task load is less than a predetermined threshold value at operation 840. If the value acquired by subtracting the minimum task load from the maximum task load is less than a predetermined threshold value and if the task load is distributed to the cores equally, there is no need of applying the method of the present disclosure and thus the distribution unit 210 allocates interrupts according to the convention method at operation 842. The conventional distribution method may be any of the first to fourth distribution methods aforementioned in the background of the disclosure. If the value acquired by subtracting the minimum task load from the maximum task load is equal to or greater than a predetermined threshold value, the procedure goes to operation 850.

The distribution unit 210 determines whether the sum of differences between the maximum task load and other task loads is equal to or greater than the sum of all interrupt loads at operation 850. If the sum of differences between the maximum task load and other task loads is equal to or greater than the sum of all interrupt loads, the interrupts are concentrated to a specific core and thus may degrade the interrupt processing capability. Accordingly, in such a case, the distribution unit 210 calculates the waiting factor $W_I$ according to equation (6) at operation 854. Otherwise if the sum of differences between the maximum task load and other task loads is less than the sum of all interrupt loads, the distribution unit 210 sets the waiting factor $W_I$ to 1. Although the weighting factor can be calculated according to equation (6), another calculation scheme may be used in a way of increasing the waiting factor as the task load difference between cores increases according to an alternative embodiment. Even in this case, the task load difference is used in determining the weighting factor.

The distribution unit 210 aligns the interrupt types in a descending order of the interrupt load amount at operation 860. The distribution unit 210 determines whether all the types of interrupts are allocated to the cores at operation 870. If there is any interrupts not allocated yet, the procedure goes to operation 880. If all of the interrupts are allocated to the cores, the procedure ends.

The distribution unit 210 aligns the cores in an ascending order of the whole load at operation 880. The whole load is the value of $L''_C{}^j$ acquired in consideration of the weighting factor in equation (7). The distribution unit 210 allocates the interrupt type of the greatest load of interrupt among the interrupt types not allocated yet to the core having the least value of whole load $L''_C{}^j$. The process of operations 870 to 890 is repeated until all of the interrupts are allocated to the corresponding cores. The process of operations 870 to 890 is performed such that the sum of the interrupt load and the task load to which the weighting factor is reflected for the respective cores is allocated to the cores equally. According to an alternative embodiment, another method capable of allocating the sum of the interrupt load and the task load to which the weighting factor is reflected for the respective cores equally may replace the process of operations 870 to 890.

The alignment processes of operations 830, 860, and 880 are performed to find the maximum/minimum value effectively. However, if the maximum/minimum value can be found using another method, the alignment processes may not be performed.

Through the above described procedure, all the types of interrupts are allocated to the corresponding cores. If an interrupt occurs afterward, the distribution unit 210 may allocate the interrupt to the core corresponding to the type of the detected interrupt.

Through the above described procedure, the interrupts can be allocated appropriately.

Figure 9:
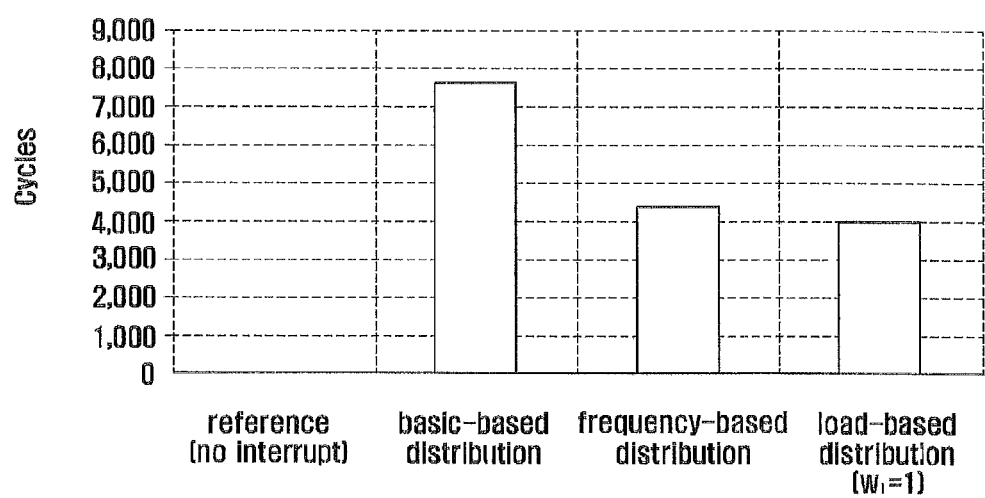
FIG. 9 is a graph illustrating the interrupt response time simulation result according to an embodiment of the present disclosure.

FIG. 9 is a graph illustrating the interrupt response time simulation result according to an embodiment of the present disclosure.

Figure 10:
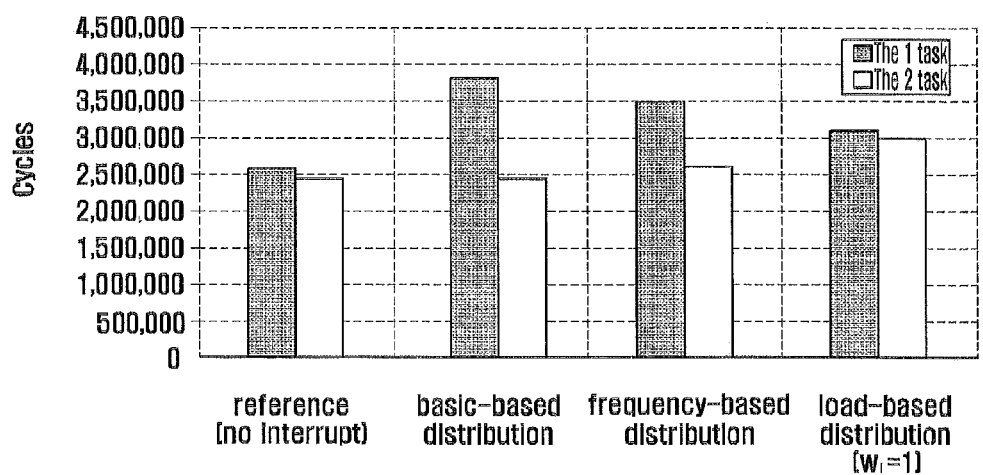
FIG. 10 is a graph illustrating the task execution time simulation result according to an embodiment of the present disclosure.

FIG. 10 is a graph illustrating the task execution time simulation result according to an embodiment of the present disclosure.

The simulation results of FIGS. 9 and 10 have been acquired obtained in a multi-core environment based on the dual-core processor and Linux kernel. The simulation has been performed in a configuration in which four interrupts occur simultaneously in the state of executing one task at each core. For reference, the graph for the case without interrupt is provided too. The basic-based distribution method is of allocating all interrupts to core 0. The frequency-based distribution method is of allocating interrupts to the cores equally based on the number of occurred interrupts. Each core is allocated two interrupts.

Referring to FIG. 9, it is shown that the interrupt response time of the method of the present disclosure is shorter than those of other methods. Referring to FIG. 10, it is shown that the task execution time of the method of the present disclosure is shorter than those of other methods. That is, the method of the present disclosure is capable of completing the task execution at a high speed while processing the interrupt quickly.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the disclosure, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

Although exemplary embodiments of the present disclosure have been described in detail hereinabove with specific terminology, this is for the purpose of describing particular embodiments only and not intended to be limiting of the disclosure. While particular embodiments of the present disclosure have been illustrated and described, it would be obvious to those skilled in the art that various other changes and modifications can be made without departing from the spirit and scope of the disclosure.

The invention claimed is:

1. An interrupt allocation method of a multi-core system, the method comprising:
    checking interrupt loads of individual interrupt types;
    checking task loads of individual cores;
    determining weighting factors using differences between the task loads of the cores;
    calculating conversion values of interrupt loads by reflecting the weighting factors; and
    allocating the interrupt types to the cores to make sums of conversion values of the interrupt loads allocated to the individual cores and the task loads equal each other.

2. The method of claim 1, wherein the checking of the interrupt loads comprises:
    checking arrival rates of the respective interrupt types;
    checking processing times of the respective interrupt types; and
    calculating the interrupt loads of the respective interrupt types by multiplying the arrival rates and the processing times.

3. The method of claim 2, wherein the checking of the processing times comprises summing time taken to distribute each interrupt and executing a handler and time taken to process an interrupt service task of each interrupt.

4. The method of claim 1, wherein the determining of the weighting factors comprises calculating the waiting factor $W_I$ using an equation:

$$W_I = \alpha \times \frac{\sum_{j \in U_C} \left[ \mathrm{Max}\{L_C^j\} - L_C^j \right]}{\sum_{k \in U_I} L_I^k}$$

where $U_C$ denotes a universal set of cores, $U_I$ denotes a universal set of interrupts, $L'_C^j$ denotes the task load of core j, $L_I^k$ denotes the interrupt load of interrupt k, and α denotes a constant determined through simulation.

5. The method of claim 4, wherein the determining of the weighting factors comprises setting, when a sum of differences between the task load of a core having greatest task load and other task loads is less than the sum of all interrupt loads, the weighting factor to 1.

6. The method claim 1, wherein the allocating the interrupt types comprises:
   determining a sum of the conversion value of the interrupt load allocated to each core and the task load of each core as the whole load of the corresponding core;
   allocating the interrupt type of the largest interrupt load, among the interrupt types not allocated yet, to the core having the least whole interrupt load; and
   repeating determination of load and allocation of interrupt type until all of the types of interrupts are allocated.

7. An interrupt allocation apparatus of a multi-core system, the apparatus comprising:
   a reception unit which receives an interrupt;
   a storage unit stores interrupt loads by interrupt type; and
   a distribution unit which checks and store task loads of individual cores, determines weighting factors using differences between the task loads of the cores, calculates conversion values of interrupt loads by reflecting the weighting factors, and allocates the interrupt types to the cores to make sums of conversion values of the interrupt loads allocated to the individual cores and the task loads equal each other.

8. The apparatus of claim 7, wherein the distribution unit checks arrival rates of the respective interrupt types, checks processing times of the respective interrupt types, and calculates the interrupt loads of the respective interrupt types by multiplying the arrival rates and the processing times.

9. The apparatus of claim 8, wherein the distribution unit sums time taken to distribute each interrupt and executing a handler and time taken to process an interrupt service task of each interrupt.

10. The apparatus of claim 7, wherein the distribution unit calculates the waiting factor $W_I$ using an equation:

$$W_I = \alpha \times \frac{\sum_{j \in U_C} \left[ \underset{j \in U_C}{\text{Max}}\{L_C^j\} - L_C^j \right]}{\sum_{k \in U_I} L_I^k}$$

where $U_C$ denotes a universal set of cores, $U_I$ denotes a universal set of interrupts, $L'^j_C$ denotes the task load of core j, $L_I^k$ denotes the interrupt load of interrupt k, and α denotes a constant determined through simulation.

11. The apparatus of claim 9, wherein the distribution unit sets, when a sum of differences between the task load of a core having greatest task load and other task loads is less than the sum of all interrupt loads, the weighting factor to 1.

12. The apparatus of claim 7, wherein the distribution unit determines a sum of the conversion value of the interrupt load allocated to each core and the task load of each core as the whole load of the corresponding core, allocates the interrupt type of the largest interrupt load, among the interrupt types not allocated yet, to the core having the least whole interrupt load, and repeats determination of load and allocation of interrupt type until all of the types of interrupts are allocated.

\* \* \* \* \*